(12) United States Patent
Farhat et al.

(10) Patent No.: US 11,441,481 B2
(45) Date of Patent: Sep. 13, 2022

(54) MECHANISM FOR A TWO-SPEED ENGINE ACCESSORY DRIVE SYSTEM IN A VEHICLE

(71) Applicant: Ford Global Technologies, LLC, Dearborn, MI (US)

(72) Inventors: Hassan Farhat, Dearborn, MI (US); Ravi Gopal, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1078 days.

(21) Appl. No.: 15/988,298

(22) Filed: May 24, 2018

(65) Prior Publication Data

US 2019/0360394 A1 Nov. 28, 2019

(51) Int. Cl.
| | | |
|---|---|---|
| *F02B 77/14* | (2006.01) | |
| *F02B 67/06* | (2006.01) | |
| *F16H 55/36* | (2006.01) | |
| *F16D 41/06* | (2006.01) | |
| *F16D 41/20* | (2006.01) | |

(52) U.S. Cl.
CPC .............. *F02B 77/14* (2013.01); *F02B 67/06* (2013.01); *F16H 55/36* (2013.01); *F02B 2275/06* (2013.01); *F16D 41/06* (2013.01); *F16D 41/203* (2013.01); *F16H 2041/0601* (2013.01); *F16H 2055/363* (2013.01)

(58) Field of Classification Search
CPC ...... F02B 67/06; F02B 77/14; F02B 2275/06; F16D 41/06; F16D 41/061; F16D 41/063; F16D 41/203; F16D 41/206; F16D 2041/0601; F16D 2041/0605; F16H 55/36; F16H 2055/363; F16H 2055/566; F16H 55/52; F16H 55/56

USPC ..... 123/195 A; 476/28; 474/70, 71, 74, 171, 474/174

See application file for complete search history.

(56) References Cited

U.S. PATENT DOCUMENTS

| | | | | |
|---|---|---|---|---|
| 2,911,962 | A | * 11/1959 | Mcrae | F01P 7/046 |
| | | | | 123/195 A |
| 4,482,038 | A | * 11/1984 | Mason | F16H 9/04 |
| | | | | 192/48.2 |

(Continued)

FOREIGN PATENT DOCUMENTS

| | | |
|---|---|---|
| BR | 102014031764 A2 | 8/2016 |
| CN | 201013552 Y | 1/2008 |

(Continued)

*Primary Examiner* — Michael R Mansen
*Assistant Examiner* — Raveen J Dias
(74) *Attorney, Agent, or Firm* — Brooks Kushman P.C.; Vincent Mastrogiacomo (57) ABSTRACT

A vehicle has an internal combustion engine, an accessory, and a system having first and second belts extending between a drive assembly rotatably connected to a crankshaft of the engine and a driven assembly rotatably connected to a driveshaft of the accessory. One of the drive and driven assemblies comprises a mechanism with a shaft supporting first and second pulleys, with the first and second pulleys associated with the first and second belts, respectively. The first pulley is selectively engaged with the shaft in response to an engine speed being below a threshold value, and the second pulley is selectively engaged with the shaft in response to the engine speed being above the threshold value.

15 Claims, 4 Drawing Sheets

(56) References Cited

U.S. PATENT DOCUMENTS

| | | | | |
|---|---|---|---|---|
| 4,488,627 | A * | 12/1984 | Streich | F16D 27/112 |
| | | | | 192/84.21 |
| 4,502,345 | A * | 3/1985 | Butterfield | B60K 25/02 |
| | | | | 123/198 R |
| 4,706,520 | A | 11/1987 | Sivalingam | |
| 4,862,770 | A | 9/1989 | Smith | |
| 5,378,210 | A | 1/1995 | Teraoka | |
| 5,827,143 | A * | 10/1998 | Monahan | F02B 67/06 |
| | | | | 474/73 |
| 5,839,401 | A * | 11/1998 | Gruber | F02B 67/06 |
| | | | | 123/198 C |
| 5,842,944 | A | 12/1998 | Morishita et al. | |
| 5,909,075 | A * | 6/1999 | Heimark | F02B 67/06 |
| | | | | 474/86 |
| 6,071,206 | A | 6/2000 | Monahan et al. | |
| 6,773,367 | B2 * | 8/2004 | Lautenberg | A01D 69/08 |
| | | | | 56/11.1 |
| 7,798,928 | B2 * | 9/2010 | Serkh | F02B 67/06 |
| | | | | 474/70 |
| 7,867,119 | B2 * | 1/2011 | Brunetiere | B60K 6/485 |
| | | | | 474/84 |
| 8,313,400 | B2 * | 11/2012 | Serkh | F16H 55/36 |
| | | | | 474/74 |
| 8,808,124 | B2 | 8/2014 | Major et al. | |
| 8,852,040 | B2 * | 10/2014 | Gebhart | F16D 27/112 |
| | | | | 474/84 |
| 9,039,552 | B2 * | 5/2015 | Hartmann | F16H 7/02 |
| | | | | 474/84 |
| 9,169,904 | B2 * | 10/2015 | Graves | F16D 47/04 |
| 9,303,734 | B2 * | 4/2016 | Serkh | F16H 7/14 |
| 9,556,918 | B2 * | 1/2017 | Staniewicz | F16D 48/06 |
| 9,726,234 | B2 * | 8/2017 | Boyes | F16D 27/105 |
| 10,907,602 | B1 * | 2/2021 | Basile | F02N 11/003 |
| 2005/0153813 | A1 * | 7/2005 | Serkh | B60K 6/48 |
| | | | | 475/324 |
| 2005/0215366 | A1 * | 9/2005 | Serkh | F16H 9/06 |
| | | | | 474/74 |
| 2006/0154763 | A1 * | 7/2006 | Serkh | F02B 67/06 |
| | | | | 474/70 |
| 2009/0291794 | A1 * | 11/2009 | Amanuma | F16D 41/088 |
| | | | | 474/171 |
| 2009/0298646 | A1 * | 12/2009 | Parsons | F16D 41/07 |
| | | | | 474/171 |
| 2010/0120563 | A1 * | 5/2010 | Serkh | F16H 55/36 |
| | | | | 474/74 |
| 2010/0122882 | A1 * | 5/2010 | Komorowski | F16D 27/105 |
| | | | | 192/103 C |
| 2014/0031156 | A1 * | 1/2014 | Graves | B60K 25/02 |
| | | | | 474/71 |
| 2016/0108806 | A1 * | 4/2016 | Serkh | F02B 67/06 |
| | | | | 474/74 |
| 2017/0059008 | A1 * | 3/2017 | Kashyap | F02B 39/04 |
| 2018/0195483 | A1 * | 7/2018 | Serkh | F16H 37/065 |
| 2019/0203637 | A1 * | 7/2019 | Lee | B60K 25/02 |

FOREIGN PATENT DOCUMENTS

| | | |
|---|---|---|
| CN | 201326458 Y | 10/2009 |
| GB | 2533035 A | 6/2016 |

* cited by examiner

MECHANISM FOR A TWO-SPEED ENGINE ACCESSORY DRIVE SYSTEM IN A VEHICLE

TECHNICAL FIELD

Various embodiments relate to a two-speed mechanism for use in an engine accessory drive system in a vehicle.

BACKGROUND

It may be desirable to operate an accessory in an engine accessory drive system at different speeds. Previously, a gear mechanism such as a planetary gearset has been used to provide multiple speed capability for the drive system, or a continuously variable transmission mechanism may be used. Alternatively, the accessory may be connected to an auxiliary electric generator, such as an alternator, to provide a higher speed than that available from the engine accessory drive system, or to provide boost for fluid pumps and compressors in the accessories. However, these conventional systems and mechanisms may be complex, costly, and require lubrication, cooling, and the like for operation.

SUMMARY

In an embodiment, a vehicle is provided with an internal combustion engine, an accessory, and a system having first and second belts extending between a drive assembly rotatably connected to a crankshaft of the engine and a driven assembly rotatably connected to a driveshaft of the accessory. One of the drive and driven assemblies is provided by a mechanism comprising a shaft supporting first and second pulleys, with the first and second pulleys associated with the first and second belts, respectively. The first pulley is selectively engaged with the shaft in response to an engine speed being below a threshold value, and the second pulley is selectively engaged with the shaft in response to the engine speed being above the threshold value.

In another embodiment, a mechanism is provided with a core positioned for translation within a coil and about a shaft having first and second pulleys. A spring is supported by the coil and is configured to bias the core with the coil deactivated to a first position to drivingly engage the first pulley with the shaft. The coil is configured to be activated to move the core to a second position to drivingly engage the second pulley with the shaft.

In yet another embodiment, a two-speed mechanism for an engine accessory drive is provided with a carrier and a shaft supported for rotation within the carrier. The shaft supports first and second pulleys. A first ball ramp assembly is supported by the carrier and has a first ramp profile. A second ball ramp assembly is supported by the carrier and has a second ramp profile oriented opposite to the first ramp profile. A first spring biases the first and second ball ramp assemblies towards one another. A solenoid and second spring are supported by the carrier and connected to the first and second ball ramp assemblies. The solenoid is configured to be activated to rotate the first and second ramp assemblies to engage the second ramp assembly such that the second pulley is drivingly engaged with the shaft and the first pulley freewheels. The second spring is configured to engage the first ramp assembly with the solenoid deactivated such that the first pulley is drivingly engaged with the shaft and the second pulley freewheels.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Various embodiments according to the present disclosure provide for a two-speed accessory drive system for use with an internal combustion engine. For example, when using a liquid-cooled condenser, the condenser may require coolant flow at a higher rate than that provided by a single pulley or fixed pulley ratio system at low engine or belt speeds, for example, at or near engine idle conditions. The system and mechanisms according to the present disclosure provide for a switchable, two-speed, dual pulley mechanism to provide two speeds, and may be used as a drive mechanism or a driven mechanism. In one example, the mechanism may include a main shaft, two freewheeling pulleys, two dry clutches, an electric coil, a core, springs, thrust bearings, and a housing. In another example, the mechanism may include a ball ramps and a linear actuator in place of the coil and core. In various examples, the clutches may be engaged by mechanical governor, such as a flyweight system, to provide passive control and actuation of the mechanism. In other examples, the mechanism may be electronically, pneumatically or hydraulically controlled. By use of a mechanism to provide higher speeds for the accessory at low engine speed, the auxiliary components may be operated at target values while the engine speed remains low, thereby increasing fuel efficiency and reducing emissions output.

Figure 1:
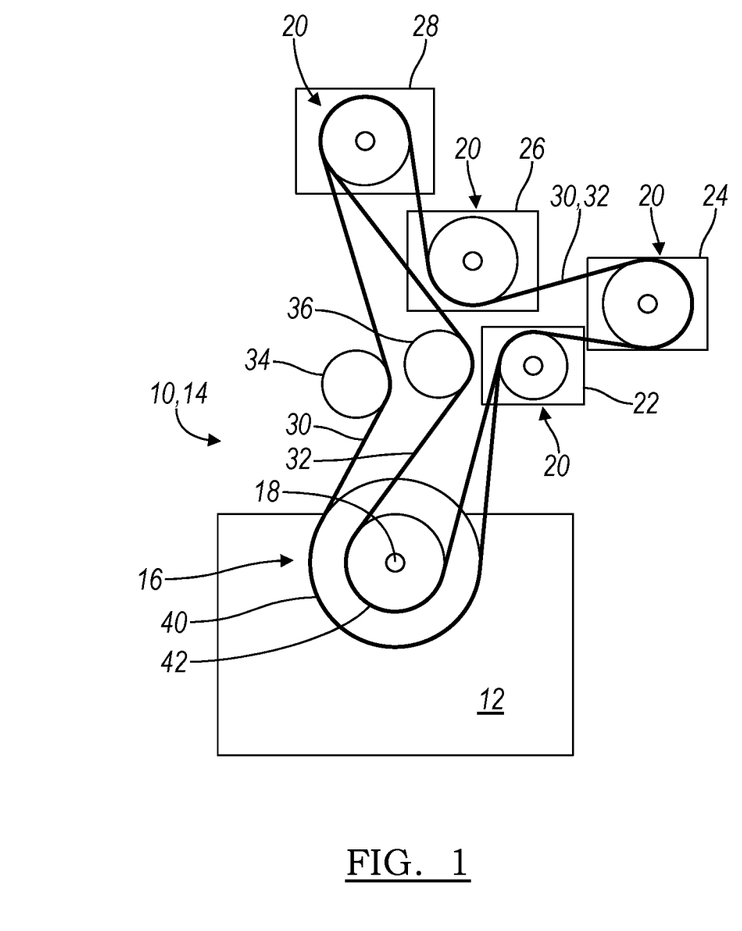
FIG. 1 illustrates a schematic of an engine and accessory drive according to an embodiment.

FIG. 1 illustrates a schematic for a front-end accessory drive system 10 according to an embodiment. The drive system 10 is driven by an internal combustion engine 12 in a vehicle 14.

A drive mechanism 16 is connected to a crankshaft 18 of the engine 12 such that it is rotated and driven by the engine during engine operation. The system 10 has one or more driven pulley assemblies 20 that are connected to driveshafts of various accessories in the vehicle. In the present example, the accessories include a steering pump 22, an air conditioning compressor 24, a coolant pump 26, and an alternator 28. In other non-limiting examples, the drive system 10 may contain additional accessories, fewer accessories, or various combinations of accessories other than those shown and described here such as various compressors, alternators, superchargers, coolant pumps, hydraulic pumps, and the like.

Figure 2:
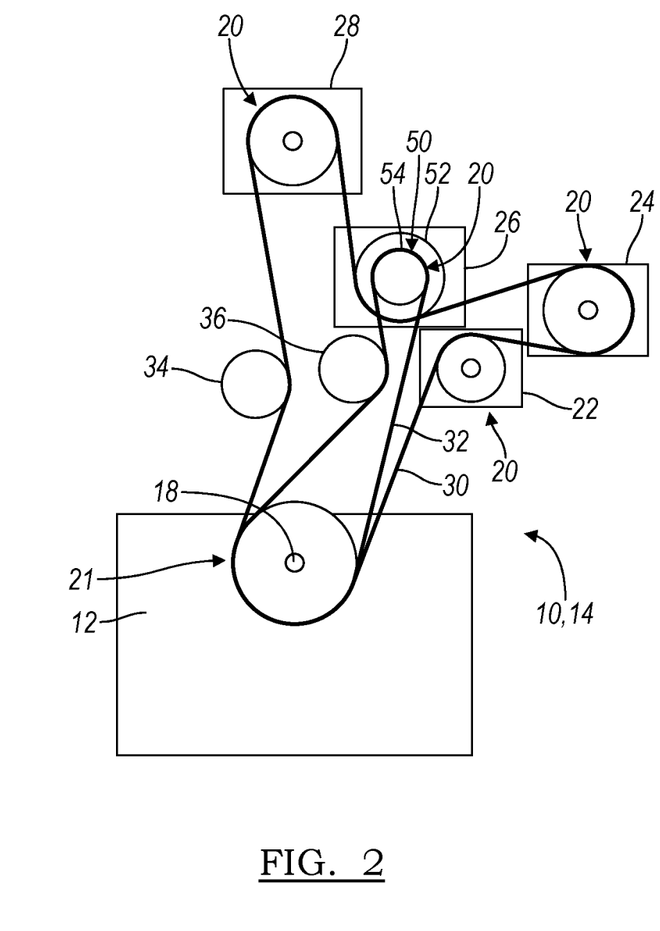
FIG. 2 illustrates a schematic of an engine and accessory drive according to another embodiment.

The drive system 10 is configured for operation using two different belts 30, 32. The drive mechanism when mounted on the crankshaft, as shown in FIG. 1, is provided with two pulleys, and the driven accessories are provided with pulley assemblies. The pulley assemblies may be a single pulley or dual pulley. The driven mechanism when mounted on an accessory as shown in FIG. 2, is provided with two pulleys, and the engine crankshaft is provided with a dual pulley assembly. Each belt 30, 32 may have an associated tensioner 34, 36.

In FIG. 1, the drive mechanism 16 is provided with differently sized pulleys to provide different speeds for the belt, e.g. first and second speeds, and the pulley assemblies 20 associated with the accessories are provided as dual pulleys. In the example shown in FIG. 1, the drive mechanism 16 is provided with a shiftable two-speed pulley mechanism with one pulley 40 having a larger diameter than another pulley 42. In one example, pulley 42 is driven by the crankshaft 18 when the engine is operating above a threshold value, and pulley 40 is driven by the crankshaft when the engine is operating below a threshold value. In one example, the threshold value may be set as an idle speed. The pulley 40, 42 that is not being driven by the crankshaft 18 based on the engine speed may operate in a freewheel condition. The driven pulley assemblies 20 may be provided with dual pulleys that are the same size as shown in FIG. 1.

FIG. 2 illustrates a schematic for a front-end accessory drive system 10 according to another embodiment. Elements that are the same or similar to those shown in FIG. 1 are given the same reference number for simplicity. The drive system 10 is driven by an internal combustion engine 12 in a vehicle 14.

A drive dual pulley assembly 21 is connected to a crankshaft 18 of the engine 12 such that it is rotated and driven by the engine during engine operation. The system 10 has one or more driven assemblies 20 that are connected to driveshafts of various accessories in the vehicle. In the present example, the accessories include a steering pump 22, an air conditioning compressor 24, a coolant pump 26, and an alternator 28. In other non-limiting examples, the drive system 10 may contain additional accessories, fewer accessories, or various combinations of accessories other than those shown and described here such as various compressors, alternators, superchargers, coolant pumps, hydraulic pumps, and the like.

The drive system 10 is configured for operation using two different belts 30, 32. The drive assembly 21 is provided as a dual pulley, and the driven assemblies are also provided as dual pulleys or single pulleys. Each belt 30, 32 may have an associated tensioner 34, 36.

One of the drive dual pulley 16 and the driven assemblies 20 or mechanisms 50 may be provided with equal or differently sized pulleys to provide different speeds for the belt, e.g. first and second speeds. In the example shown in FIG. 2, the driven mechanism 50 for the coolant pump 26 is provided with a shiftable two-speed pulley mechanism with one pulley 52 having a larger diameter than another pulley 54. In one example, pulley 52 drives the driveshaft of the accessory 26 when the engine is operating above a threshold value, and pulley 54 drives the driveshaft of the accessory 26 when the engine is operating below a threshold value. In one example, the threshold value may be set as an idle speed. The pulley 52, 54 that is not driving the accessory driveshaft based on the engine speed may operate in a freewheel condition. The remaining driven pulleys 20 may be provided with single pulleys, which sizes are determined by the required speed of their corresponding accessories.

In further embodiments, additional accessories in the system 10 of FIG. 2 may be provided with associated driven mechanisms 50 to provide shiftable two speed operation of multiple accessories. In this scenario, the various mechanisms 50 may use a similar threshold value or a different threshold value to engage and disengage, and may have dual pulleys with varying size ratios. The mechanisms 50 may be used to separately and independently control the speed of the associated driveshaft of the connected accessory, for example, to simultaneously or separately increase the speeds of the accessories, to simultaneously or separately decrease the speeds of the accessories, or to simultaneously or separately increase the speed of one accessory and decrease the speed of the other accessory.

Figure 3:
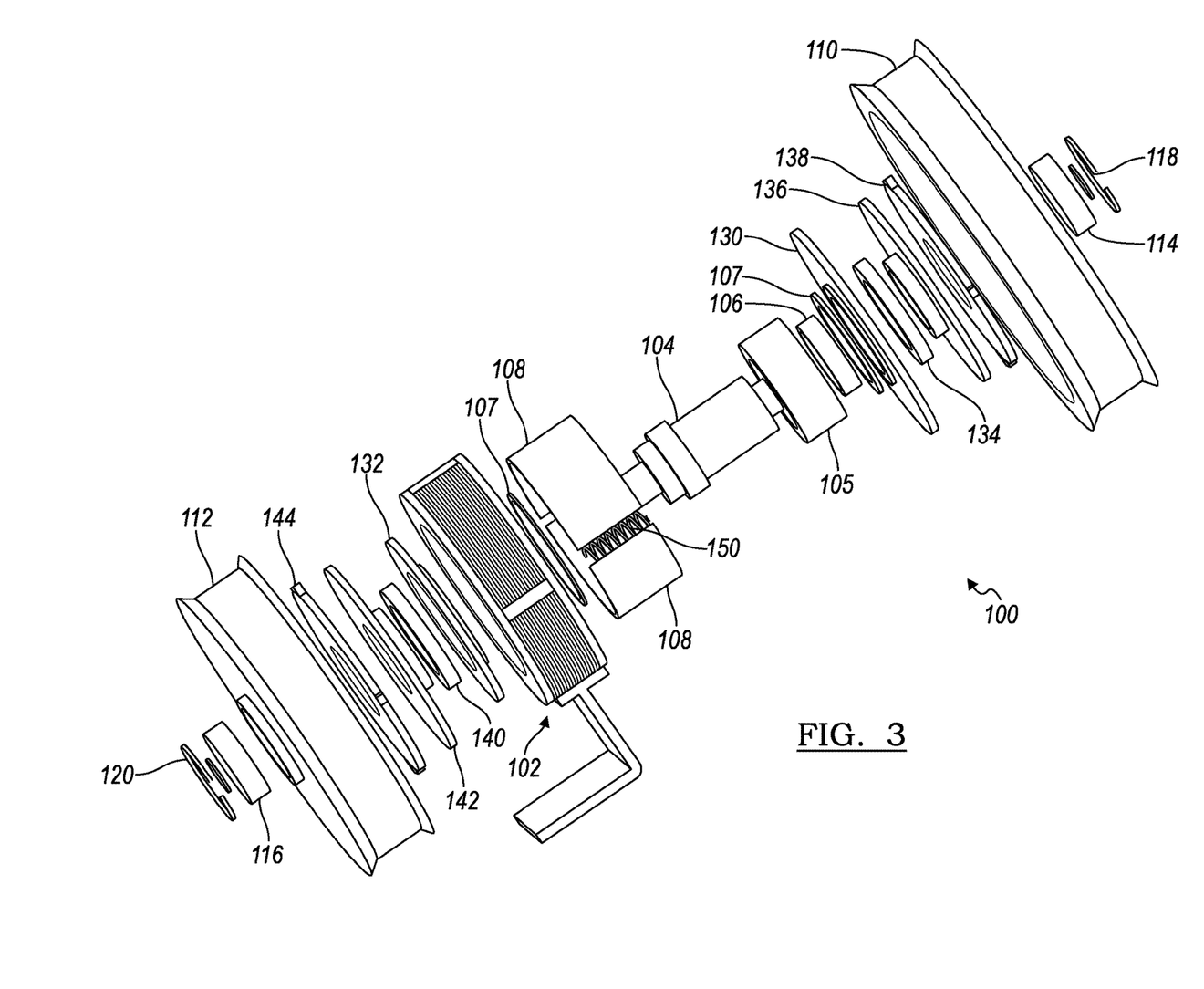
FIG. 3 illustrates an exploded view of a mechanism for use with the engine and accessory drive of FIGS. 1-2 according to an embodiment
Figure 4:
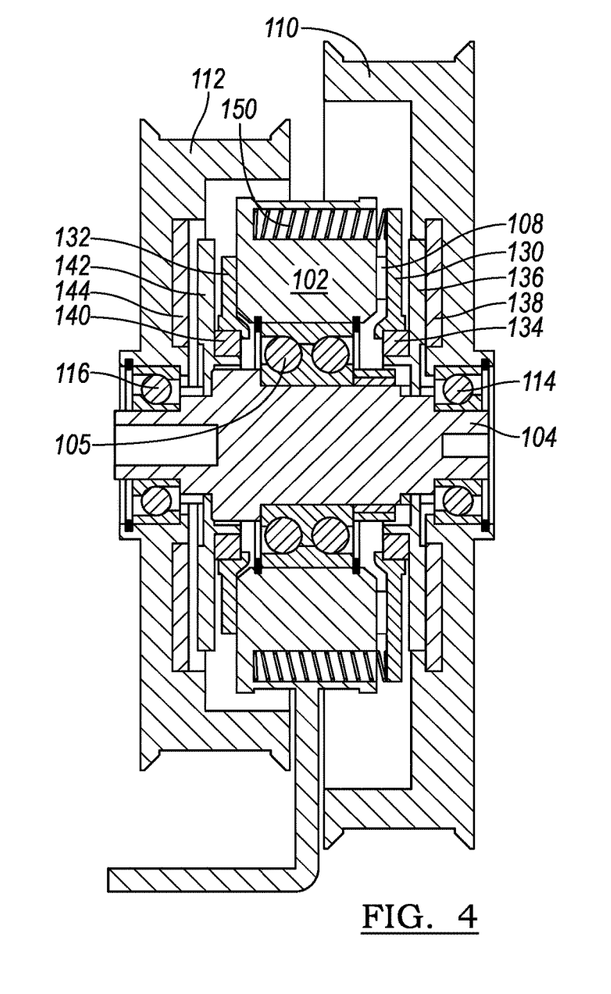
FIG. 4 illustrates a sectional view of the mechanism of FIG. 3 in a first position.
Figure 5:
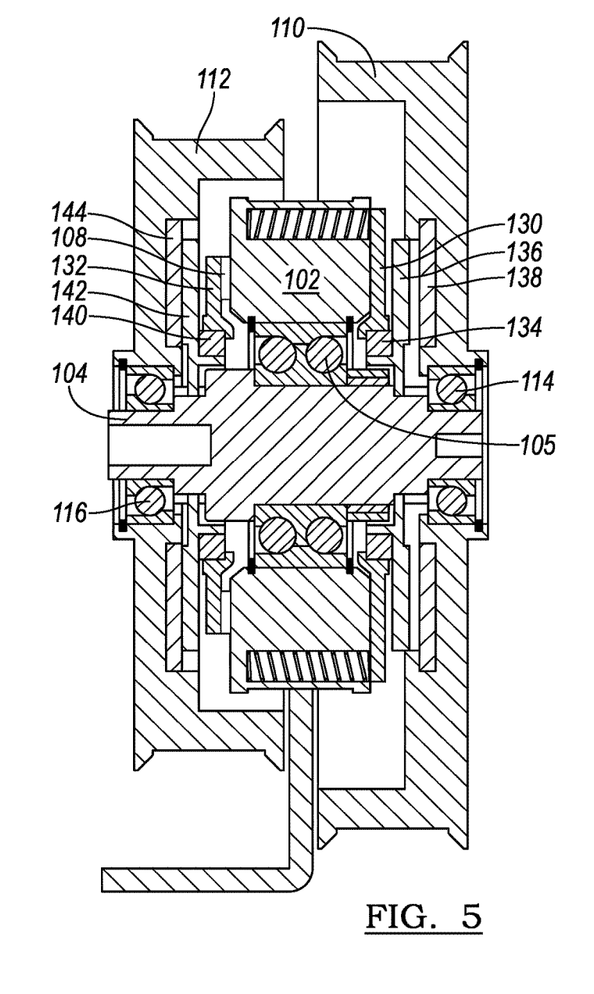
FIG. 5 illustrates a sectional view of the mechanism of FIG. 3 in a second position.

FIGS. 3-5 illustrate a mechanism 100 for use as the driven mechanism 50 of FIG. 2 according to an embodiment.

The mechanism 100 has a coil assembly 102, or coil, with an associated housing or carrier structure that is configured to be connected to a vehicle structure. As used herein, coil may refer to the winding and/or the surrounding housing or carrier structure. A shaft 104 is positioned within the coil 102 and is rotatably supported within the coil 102 via a bearing assembly 105, e.g. a shaft bearing such as a dual angular thrust bearing. The shaft 104 may be located relative to the housing via a nut 106 and retention rings 107, or other similar components. The shaft 104 is configured to be connected to a crankshaft of an engine or to a driveshaft of an accessory. With reference to the description below, and as a non-limiting example, the mechanism 100 is described for use as a driven mechanism 50 connected to a coolant pump. The shaft 104 may be connected to the pump via a splined connection, keyway, or the like.

A core 108 is supported within the coil 102 and is configured to translate with respect to the coil 102 and the shaft 104 between a first position and a second position. The core 108 may be provided as a split core made up of two or more elements. In the example, shown, the core 108 is provided by four arcuate shells that fit between an inner portion and an outer portion of the coil housing 102.

The mechanism 100 has a first pulley 110 and a second pulley 112 supported at opposite ends of the shaft 104. The first pulley 110 is supported on the shaft 104 via a bearing assembly 114, such as an angular thrust bearing assembly. The second pulley 112 is supported on the shaft 104 via a bearing assembly 116, such as an angular thrust bearing assembly. Retaining rings 118, 120 are provided to retain the pulleys 110, 112 on the shaft 104. The first and second pulleys 110, 112 are associated with the first and second belts of the system, respectively. For a driven mechanism 50, the first pulley 110 is selectively engaged with the shaft 104 in response to an engine speed being above a threshold value, and the second pulley 112 is selectively engaged with the shaft 104 in response to the engine speed being below the threshold value.

The mechanism 100 has first and second retention plates 130, 132 that are connected to opposite ends of the core 108. The plates 130, 132 therefore translate with the core 108 between the first and second positions.

The mechanism 100 has a first thrust bearing 134, a first pressure plate 136, and a first friction plate 138 that are positioned sequentially between the first retention plate 130 and the first pulley 110. The first thrust bearing 134 and the first pressure plate 136 are configured to translate relative to the shaft 104 and the coil 102. The first friction plate 138 may be connected to the first pulley 110.

The mechanism 100 also has a second thrust bearing 140, a second pressure plate 142, and a second friction plate 144 that are positioned sequentially between the second retention plate 132 and the second pulley 112. The second thrust bearing 140 and the second pressure plate 142 are configured to translate relative to the shaft 104 and the coil 102. The second friction plate 144 may be connected to the second pulley 112.

The mechanism 100 has at least two springs 150 that extends from the housing of the coil 102 to the first retention plate 130. In the example shown, the mechanism 100 has multiple springs 150 that are provided circumferentially about the coil 102, and extend into the housing of the coil 102. A first end of each spring is in contact with the housing of the coil 102, and a second end of each spring is in contact with the first retention plate 130. The core 108 is split in part to allow for reinforcement ribs within the coil housing 102 to interconnect the inner and outer portions of the coil housing 102.

The springs 150 act to bias the core 108 into the first position when the coil 102 is deactivated such that the core 108 is in a first position, as shown in FIG. 4. When the core 108 is in the first position, the first pulley 110 is drivingly engaged with the shaft 104, or is fixed for rotation with the shaft. The springs 150 act to bias the core 108 relative to the coil 102 such that the spring force is directed through the core 108, first retention plate 130, first thrust bearing 134, first pressure plate 136, first friction plate 138, and the first pulley 110. The first pulley 110 is drivingly connected to the shaft 104 via the first friction plate 138 and first pressure plate 136.

When the core 108 is in the first position, the second pulley 112 is configured to freewheel on the shaft 104, as the second pressure plate 142 is spaced apart from and disengaged from the second friction plate 144.

When the core 108 is in the first position, the core 108, the first retention plate 130, the first thrust bearing 134, the first pressure plate 136, the first friction plate 138, the first pulley 110, and the shaft 104 are engaged for rotation together, and the second pressure plate 142 and the second friction plate 144 are disengaged and spaced apart from one another.

When the coil 102 is activated, the core 108 is moved or translated from the first position to a second position, as shown in FIG. 5. The coil 102 may be provided as a winding and the core 108 may be provided as an armature, such that the coil 102 and core 108 act as an electromechanical solenoid and the coil 102 uses electromagnetic forces to move the core 108. When the core 108 is in the second position, the second pulley 112 is drivingly engaged with the shaft 104, or is fixed for rotation with the shaft 104. The force of the coil 102 acting on the core 108 is greater than and overcomes the spring force provided by the springs 150.

When the core 108 is in the second position, the first pulley 110 is configured to freewheel on the shaft 104, as the first pressure plate 136 is spaced apart from and disengaged from the first friction plate 138.

The coil 102 force is greater than the spring 150 force such that the force from the coil 102 is directed through the core 108, the second retention plate 132, the second thrust bearing 140, the second pressure plate 142, the second friction plate 144, and the second pulley 112. The second pulley 112 is drivingly connected to the shaft 104 via the second friction plate 144 and second pressure plate 142.

When the core 108 is in the second position, the core 108, the second retention plate 132, the second thrust bearing 140, the second pressure plate 142, the second friction plate 144, the second pulley 112, and the shaft 104 are engaged for rotation together, and the first pressure plate 136 and the first friction plate 138 are disengaged and spaced apart from one another.

As shown in FIGS. 3-5, the first pulley 110 has a larger diameter than the second pulley 112. For the mechanism 100 as a drive pulley 21 connected to the engine, the coil is configured to be activated and hence to shift to second pulley 112 with an engine speed and crankshaft speed is smaller than a threshold value. The threshold value may be an engine idle speed, a function of engine idle speed, or another selected value.

In an alternative example, the mechanism 100 may be provided as a drive mechanism 16 such that the shaft 104 is connected to an engine crankshaft. In this example, the mechanism 100 remains the same except that the first pulley 110 is provided with a smaller diameter than the second pulley 112 such that the mechanism 100 is engaged by the springs 150 under typical engine operating conditions above idle speed or another threshold, and is activated to engage the other pulley at idle speed or below the threshold. The use of springs to engage the mechanism 100 above the threshold and at higher engine speed reduces the energy consumed by the mechanism. The engine running above the threshold speed constitutes the larger percentage of the vehicle duty cycle.

Figure 6:
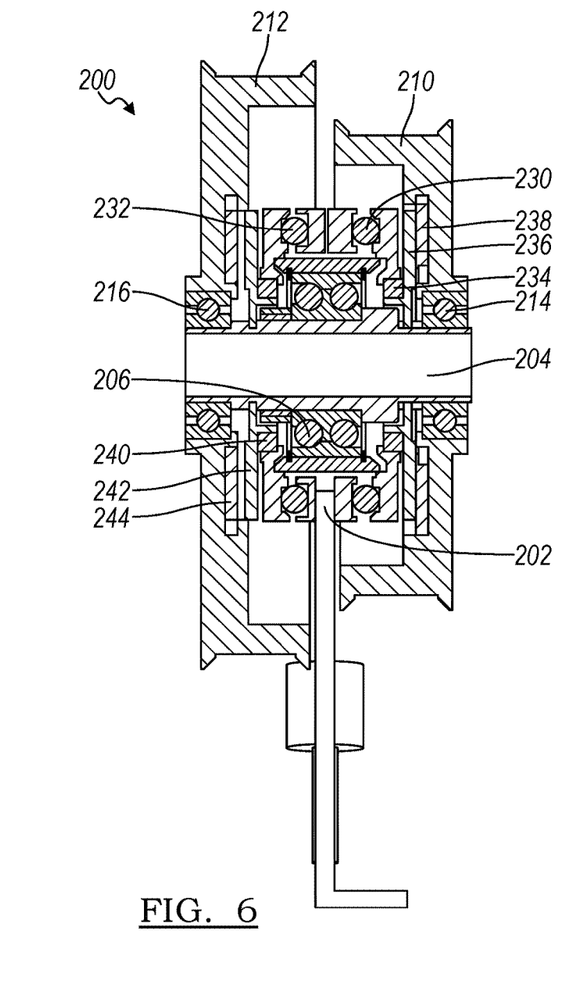
FIG. 6 illustrates a sectional view of a mechanism for use with the engine and accessory drive of FIGS. 1-2 according to another embodiment.
Figure 7:
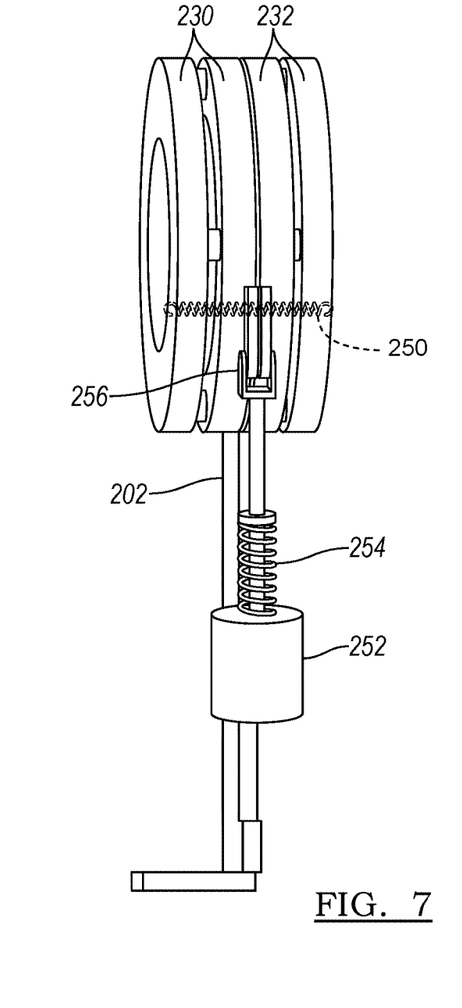
FIG. 7 illustrates a perspective view of a portion of the mechanism of FIG. 6.

FIGS. 6-7 illustrate a mechanism 200 for use as the drive mechanism 16 of FIG. 1 or the driven mechanism 50 of FIG. 2 according to another embodiment.

The mechanism 200 has a housing or carrier structure 202 that is configured to be connected to a vehicle structure. A shaft 204 is positioned within the carrier 202 and is rotatably supported within the carrier 202 via a bearing assembly 206, e.g. a shaft bearing such as a dual angular thrust bearing. The shaft 204 may be located relative to the housing via a nut, retention rings, or other similar components. The shaft 204 is configured to be connected to a crankshaft of an engine or to a driveshaft of an accessory. With reference to the description below, and as a non-limiting example, the mechanism 200 is described for use as a drive mechanism 16 connected to the engine crankshaft. The shaft 204 may be connected to the crankshaft via a splined connection, press fit connection, keyway connection, or the like.

The mechanism 200 has a first pulley 210 and a second pulley 212 supported at opposite ends of the shaft 204. The first pulley 210 is supported on the shaft 204 via a bearing assembly 214, such as an angular thrust bearing assembly. The second pulley 212 is supported on the shaft 204 via a bearing assembly 216, such as an angular thrust bearing assembly. Retaining rings are provided to retain the pulleys 210, 212 on the shaft 204. The first and second pulleys 210, 212 are associated with the first and second belts of the system, respectively. For a drive mechanism 16, the first pulley 210 is selectively engaged with the shaft 204 in response to an engine speed being above a threshold value, and the second pulley 212 is selectively engaged with the shaft 204 in response to the engine speed being below the threshold value.

The mechanism 200 has first and second ball ramp assemblies 230, 232 that are supported for rotation on opposite ends of the carrier 202. The ball ramp assemblies 230, 232 may be rotatably supported by a bearing, a bushing, or the like. The first and second ball ramp assemblies 230, 232 have first and second ramp profiles, respectively. Each of the first and second ramp profiles extends from a first depth to a second depth, with the second depth greater than the first depth. The second ramp profile is oriented opposite to the first ramp profile. Therefore, when a ball is positioned in the second depth region of the first ramp profile of the first ball ramp assembly 230, another ball is positioned in the first depth region of the second ramp profile of the second ball ramp assembly 232.

The mechanism 200 has a first thrust bearing 234, a first pressure plate 236, and a first friction plate 238 that are positioned sequentially between the first ball ramp assembly 230 and the first pulley 210. The first thrust bearing 234 and the first pressure plate 236 are configured to translate relative to the shaft 204 and the carrier 202. The first friction plate 238 may be connected to the first pulley 210.

The mechanism 200 also has a second thrust bearing 240, a second pressure plate 242, and a second friction plate 244 that are positioned sequentially between the second ball ramp assembly 232 and the second pulley 212. The second thrust bearing 240 and the second pressure plate 242 are configured to translate relative to the shaft 204 and the carrier 202. The second friction plate 244 may be connected to the second pulley 212.

A first spring 250 biases the first and second ball ramp assemblies towards one another, as shown in broken lines in FIG. 7. The mechanism 200 may be provided with multiple springs 250 arranged circumferentially about the ball assemblies 230, 232. A solenoid 252 and second spring 254 are supported by the carrier 202 and connected to the first and second ball ramp assemblies 230, 232 at connection 256.

With the solenoid 252 deactivated, the spring 250 is configured to bias the assemblies 230, 232 towards one another. Spring 254 also biases the connection 256 first and second ball ramp assemblies 230, 232 in an upward direction as shown in FIG. 7 to rotate the ball ramp assemblies 230, 232 such that the first ball ramp assembly 230 is engaged with the first pressure plate 236 and the first pulley 210 rotates with the shaft 204. FIG. 6 illustrates the mechanism 200 with the solenoid 252 deactivated such that the first pulley 210 is engaged with the shaft 204 for rotation therewith, and the second pulley 212 is disengaged, as can be seen by the spacing in FIG. 7. The springs 250, 254 therefore are configured to engage the first ball ramp assembly 230 with the solenoid deactivated such that the first pulley 210 is drivingly engaged with the shaft 204 and the second pulley 212 freewheels.

Therefore, in the position shown in FIG. 6, the pulley 210 is engaged and the solenoid 252 is deactivated. The spring 250 force is applied from the first ball ramp assembly 230, to the first thrust bearing 234, the first pressure plate 236, the first friction plate 238, and the first pulley 210. The first pulley 210 is drivingly connected to the shaft 204 via the first friction plate 238, and the first pressure plate 236.

When the solenoid 252 is activated, the force provided by the solenoid is sufficient to overcome the spring 254 force, and the spring 250 force. The connection 256 for the first and second ball ramp assemblies is rotated or moved in a downward direction with reference to FIG. 7 such that the second ball ramp assembly 232 is engaged and the second pulley 212 rotates with the shaft 204. When the solenoid 252 is activated, the second pulley 212 is drivingly engaged with the shaft 204 and the first pulley 210 freewheels.

As shown in FIGS. 6-7, the first pulley 210 has a smaller diameter than the second pulley 212. For the mechanism 200 as a drive mechanism 16 connected to the crankshaft, the solenoid 252 is configured to be activated with an engine speed and crankshaft speed is less than a threshold value. The threshold value may be an engine idle speed, a function of engine idle speed, or another selected value.

In an alternative example, the mechanism 200 may be provided as a driven mechanism 50 such that the shaft 204 is connected to an auxiliary component. In this example, the mechanism 200 remains the same except that the first pulley 210 is provided with a larger diameter than the second pulley 212.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   an internal combustion engine;
   an accessory; and
   a system having first and second belts extending between a drive assembly rotatably connected to a crankshaft of the engine and a driven assembly rotatably connected to a driveshaft of the accessory;
   wherein one of the drive and driven assemblies is provided by a mechanism comprising a shaft supporting first and second pulleys, the first and second pulleys associated with the first and second belts, respectively, wherein the first pulley is selectively engaged with the shaft in response to an engine speed being below a threshold value, and wherein the second pulley is selectively engaged with the shaft in response to the engine speed being above the threshold value; and
   wherein the mechanism of the one of the drive and driven assemblies further comprises a coil, a core supported for translation about the shaft and within the coil, and a spring member, wherein the spring member is configured to bias the core to a first position such that the second pulley is engaged with the shaft, and wherein the coil is configured to be activated to move the core to a second position such that the first pulley is engaged with the shaft.

2. The vehicle of claim 1 wherein the other of the drive and driven assemblies comprises another shaft supporting third and fourth pulleys fixed for rotation therewith, the third and fourth pulleys associated with the first and second belts, respectively.

3. The vehicle of claim 1 wherein the second pulley freewheels on the shaft when the first pulley is selectively engaged with the shaft in response to the engine speed being below the threshold value; and
   wherein the first pulley freewheels on the shaft when the second pulley is selectively engaged with the shaft in response to the engine speed being above the threshold value.

4. The vehicle of claim 1 wherein the accessory comprises one of a compressor, alternator, supercharger, coolant pump, and hydraulic pump; and
   wherein the mechanism is rotatably connected to the driveshaft of the accessory.

5. A mechanism comprising:
   a core positioned for translation within a coil and about a shaft having first and second pulleys;
   a spring supported by the coil and configured to bias the core with the coil deactivated to a first position to drivingly engage the first pulley with the shaft; and wherein the coil is configured to be activated to move the core to a second position to drivingly engage the second pulley with the shaft.

6. The mechanism of claim 5 wherein the second pulley is configured to freewheel on the shaft with the core in the first position; and wherein the first pulley is configured to freewheel on the shaft with the core in the second position.

7. The mechanism of claim 5 wherein the coil is configured to be activated when an engine speed is less than a threshold value.

8. The mechanism of claim 5 wherein the first pulley has a larger diameter than the second pulley; and wherein the shaft is configured to be drivingly connected to a crankshaft of an engine.

9. The mechanism of claim 5 wherein the first pulley has a smaller diameter than the second pulley; and wherein the shaft is configured to be drivingly connected to a driven shaft of an engine accessory.

10. The mechanism of claim 5 wherein the first pulley is supported at a first end of the shaft by a first thrust bearing; and wherein the second pulley is supported at a second end of the shaft by a second thrust bearing.

11. The mechanism of claim 5 further comprising:

a first retention plate, a first thrust bearing, a first pressure plate, and a first friction plate positioned sequentially between the core and the first pulley; and a second retention plate, a second thrust bearing, a second pressure plate, and a second friction plate positioned sequentially between the core and the second pulley.

12. The mechanism of claim 11 wherein, with the core in the first position, the core, the first retention plate, the first thrust bearing, the first pressure plate, the first friction plate, the first pulley, and the shaft are engaged for rotation together, and the second pressure plate and the second friction plate are disengaged and spaced apart from one another.

13. The mechanism of claim 11 wherein, with the core in the second position, the core, the second retention plate, the second thrust bearing, the second pressure plate, the second friction plate, the second pulley, and the shaft are engaged for rotation together, and the first pressure plate and the first friction plate are disengaged and spaced apart from one another.

14. The mechanism of claim 11 wherein the first and second retention plates are connected to the core to translate therewith; and wherein the spring extends from the coil to the first retention plate.

15. The mechanism of claim 5 further comprising a bearing assembly rotatably supporting the shaft within the coil; and wherein the core comprises a first arcuate shell and a second arcuate shell.

* * * * *